United States Patent [19]

LaValley

[11] 4,248,716
[45] Feb. 3, 1981

[54] TRUNNION AND TRUNNION PACKING SLEEVE INSERT FOR ROTARY DRUM FILTER

[75] Inventor: Richard W. LaValley, Vancouver, Wash.

[73] Assignee: LaValley Industrial Plastics, Inc., Vancouver, Wash.

[21] Appl. No.: 32,097

[22] Filed: Apr. 22, 1979

[51] Int. Cl.³ .............................................. B01D 33/06
[52] U.S. Cl. .................................................... 210/402
[58] Field of Search ............... 210/392, 404; 277/9, 277/165, DIG. 7; 29/401; 308/36.1, 187.1, 187.2

[56] References Cited

U.S. PATENT DOCUMENTS

| 2,884,269 | 4/1959 | Remite et al. | 277/68 |
| 3,502,375 | 3/1970 | Whittum | 308/187.2 |
| 3,504,802 | 4/1970 | Luthi | 210/404 |
| 3,608,987 | 9/1971 | Jordon | 308/187.1 |
| 3,778,881 | 12/1973 | Knapp | 277/9 |
| 3,894,899 | 7/1975 | Konopatou et al. | 210/404 |

Primary Examiner—Theodore A. Granger

[57] ABSTRACT

A rotary drum filter used to form and wash a pulp mat in the paper making process has a cylindrical filter drum with trunnions at its opposite ends mounting the drum for rotation about a central axis. One of the trunnions is hollow and is rotatably connected to an open end of a stationary vacuum pipe for draining filtrate from the drum during its rotation. Packing material provides a fluid seal at the rotatable connection between the vacuum pipe and the hollow trunnion. The hollow trunnion has an inner wall lined with a fiberglass-reinforced plastic material. An outer end portion of the inner wall is recessed to provide a seat for a packing sleeve insert made of an abrasion-resistant material. The inner surface of the packing sleeve insert provides a continuation of the lined inner surface of the hollow trunnion. An outer flange collar of the insert is threadedly fastened to an outer end surface of the hollow trunnion to hold the insert in place. When the packing sleeve insert wears out, it is removed from the trunnion and replaced with a new one.

10 Claims, 4 Drawing Figures

U.S. Patent  Feb. 3, 1981  4,248,716
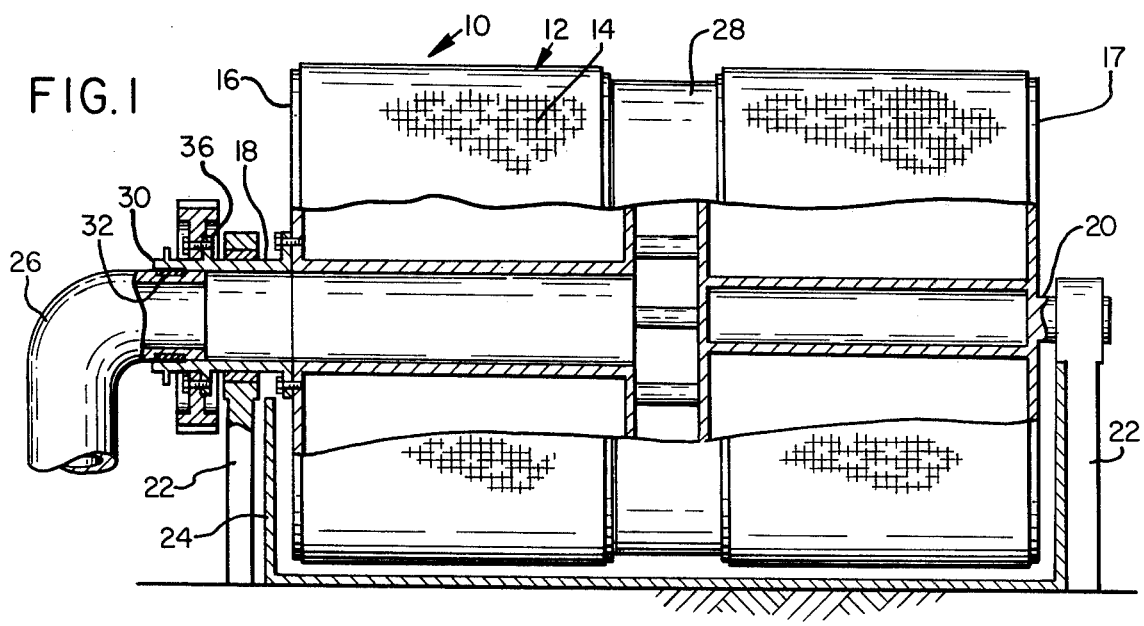
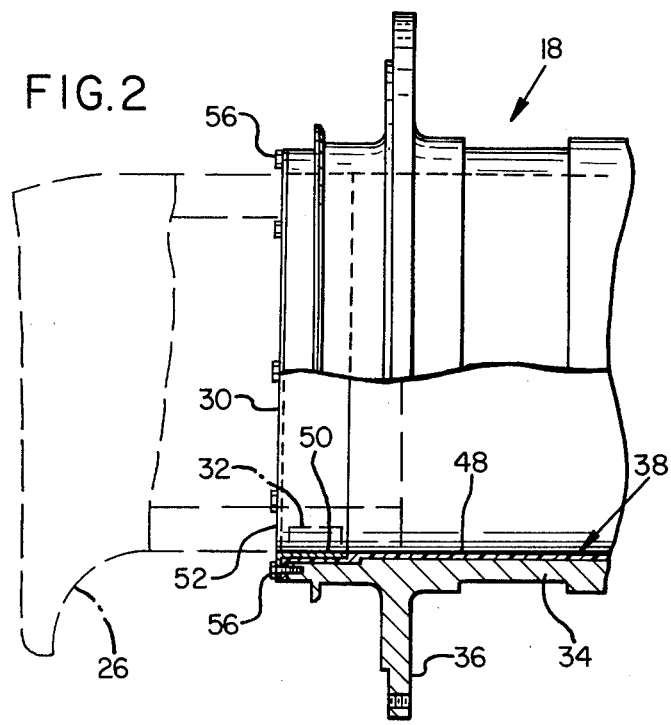

TRUNNION AND TRUNNION PACKING SLEEVE INSERT FOR ROTARY DRUM FILTER

BACKGROUND OF THE INVENTION

1. Field of the Invention

The present invention relates to rotary drum filters used in the manufacture of pulp in the paper making process, and more particularly to a hollow trunnion with a replaceable packing sleeve insert for such a filter.

2. Description of the Prior Art

In known rotary drum filters, the filter drum has a hollow trunnion, usually made of mild steel. The inner wall of such trunnion is lined throughout its length with an abrasion- and chemically-resistant material, such as stainless steel, for withstanding the abrasion of its packing seal and the chemical action of the filtrate which passes through the trunnion. When this lining wears out, as it always does sooner or later, either the entire trunnion or its lining must be replaced. If the latter course is chosen, the original lining must be laboriously cut out in its entirety and replaced with a new one, which also eventually wears out, so that the repair must be repeated. Either alternative is expensive because of the high replacement cost of a new trunnion, and because the relining process is labor-intensive. Both alternatives also require that the entire paper production line be shut down for a considerable period of time while the faulty filter drum is removed from the line and replaced with another one, or while the drum is repaired on line. In either case, considerable production time is lost, and the additional expense of installing a replacement drum while repairs are made will be self-evident.

Thus, there is a need for a better hollow trunnion for rotary drum filters which is more wear-resistant and which can be more easily repaired, preferably on-line, when its lining needs replacement because of wear or chemical action.

SUMMARY OF THE INVENTION

According to the present invention, a hollow trunnion for a rotary drum filter has an inner wall lined with a fiberglass-reinforced plastic material throughout its length, such plastic material being highly resistant to the chemical action of filtrates used in the pulp washing process. The inner wall portion of such trunnion, subject to abrasion because of sealing contact with the packing between the trunnion and vacuum pipe, is provided with a removable packing sleeve insert made of an abrasion-resistant material such as stainless steel. The packing sleeve insert is seated within a recess in the inner wall of the trunnion so that its inner surface forms a continuation of the remaining lined inner wall. The insert is held in place by a flanged outer collar through which threaded fasteners extend into an outer end wall of the trunnion. When the insert wears out it is simply and quickly removed from the trunnion and replaced with a new one, whereby the trunnion, and thus the entire filter drum, can be placed back in service quickly and with a minimum of lost production time.

Accordingly, primary objects of the present invention are:

To provide an improved trunnion construction for a rotary drum filter;

To provide a hollow trunnion construction as aforesaid, which is more resistant to chemical action than prior such hollow trunnions;

To provide a hollow trunnion construction as aforesaid with a replaceable packing sleeve insert to resist abrasive wear of the packing seal;

To prolong the life of the hollow trunnions of rotary drum filters;

To simplify and speed up the repair of the hollow trunnions of drum filters worn out due to abrasion; and To reduce the cost of repairing the hollow trunnions of rotary drum filters.

The foregoing and other objects, features and advantages of the present invention will become more apparent from the following detailed description which proceeds with reference to the accompanying drawings.

BRIEF DESCRIPTION OF THE DRAWINGS

FIG. 1 is a somewhat schematic elevational view of a rotary drum filter of the type having a hollow trunnion rotatably connected to a vacuum pipe at one end, such trunnion being the subject of the present invention;

FIG. 2 is an enlarged partial longitudinal sectional view of the hollow trunnion portion of the rotary drum filter of FIG. 1;

FIG. 3 is an end view of the outer end of the trunnion of FIG. 2; and

FIG. 4 is an enlarged sectional view of an outer end portion of the trunnion of FIG. 2.

DETAILED DESCRIPTION OF PREFERRED EMBODIMENT

Referring to FIG. 1, a typical rotary drum filter 10 includes a cylindrical filter drum 12 having an outer cylindrical filter surface 14 and opposite end walls 16, 17. The drum is mounted for rotation about a central axis on trunnions 18, 20 by supports 22 so that as the drum rotates its filter surface passes through a pulp slurry within a tank 24.

Trunnion 18 is hollow, bolted at its inner end to drum end wall 16 and rotatably connected at its outer end to a stationary vacuum pipe 26 connected to a source of vacuum (not shown) for draining filtrate liquid from the surface of the drum. The filtrate passes from such surface in a well known manner through a valve structure 28 and through suitable passages (not shown) within the interior of the drum and through hollow trunnion 18 to the vacuum pipe.

As shown best in FIGS. 2 and 3, hollow trunnion 18 has an open outer end 30 through which the upper end portion of vacuum pipe 26 is received within the interior of the trunnion. Packing material 32 fills the space between the outer surface of vacuum pipe 26 and the inner wall of the trunnion to provide a fluid-tight seal at the rotatable connection between the two. The stationary packing material 32 bearing against the inner wall of the rotatable trunnion subjects such wall to abrasive wear.

Trunnion 18 has a main body portion 34 of mild steel, including the outer trunnion flange 36 provided for connecting the trunnion to a drive means for rotating the connected drum.

Trunnion 18 has a cylindrical inner wall 38 extending from the open outer end 30 to an open inner end (not shown) thereof. Inner wall 38 includes an annular recessed inner surface portion 40 adjacent its outer end. Recessed surface 40 extends from a stepped annular shoulder 42, where the recessed portion meets an adjacent inner wall portion 44, to an outer end surface 46 of the trunnion.

The entire length of the inner wall 38, including the recessed surfaced portion 40, is lined with a continuous lining 48 of fiberglass-reinforced plastic. Such lining also extends over the outer end surface 46, providing an exposed lining portion 48a. It has been found that the fiberglass-reinforced plastic lining is more resistant to the chemical action of the pulp filtrates than previously-used stainless steel linings.

A cylindrical packing sleeve insert 50 is removably mounted within the recess formed by the recessed inner surface portion 40. The insert includes a flanged outer collar portion 52, which overlies and abuts the outer end surface 46 of the trunnion.

The insert is preferably made of a highly abrasion-resistant material such as stainless steel. The insert is sized such that when the flanged collar is in abutment against the lining 48a of the outer end surface of the trunnion, an inner end 54 of the insert is in abutment against the stepped shoulder 42 of the inner wall. Accordingly, the inner end 54 of the insert is stepped to complement the stepped shoulder 42 of the inner wall, thereby providing a tight seam where they meet.

The inner diameter of the insert corresponds to the inner diameter of the inner wall portion adjacent the insert so that when installed the inner surface of the insert provides a smooth continuation of the lined inner surface of the adjacent inner wall portion 44, as shown best in FIG. 4. Of course, to provide this feature the outer diameter of insert 50 must correspond to the inner diameter of the recessed inner surface portion 40 of the trunnion. Thus, when installed, the insert overlies the fiberglass-reinforced plastic lining of the outer end surface and the recessed inner surface of the trunnion.

The insert is removably mounted within the recessed inner wall portion by threaded fasteners 56. Such fasteners extend through circumferentially spaced apart openings in the flanged collar portion 52 and through the lining of the outer end surface and into the main body portion of the trunnion to anchor the insert in place. Preferably, the mating surfaces of the insert and trunnion are sealed with a suitable sealing compound such as a silicone.

OPERATION

In operation, the hollow trunnion is affixed to end wall 16 of the filter drum, as shown in FIG. 1. The upper end of vacuum pipe 26 extends into the open outer end 30 of the trunnion and a fluid seal is provided therebetween by the packing material 32. As the drum, and thus the trunnion, rotates, the packing material rubs against the rotating insert 50.

The fiberglass-reinforced plastic lining of the hollow trunnion's inner wall provides an effective chemically-resistant surface which protects the trunnion against the chemical action of the filtrate liquids which pass therethrough. However, the lining is not as abrasion resistant as stainless steel; hence, the need for the packing sleeve insert of abrasion-resistant material.

After long usage, the packing sleeve insert 50 will wear out and need replacement. To do this, bolts 56 are simply unthreaded from the outer end of the trunnion, whereafter the worn out insert can simply be slipped axially from the trunnion. Thereafter, a new insert of identical construction is inserted in place of the old one and fastened into place with threaded fasteners 52, after which the drum filter is ready to continue in operation.

It will be apparent from the foregoing that the replacement of the packing sleeve insert when necessary can be done quickly and efficiently, without removing the trunnion from the filter drum and without removing the filter drum from the production line. Moreover, only a minimum of production time is lost in making the replacement. Of course, the packing material 32 and vacuum pipe 26 must be removed temporarily from the open outer end of the trunnion to make the sleeve replacement.

The savings in time, cost and lost production time over the prior practice of removing the entire drum, or at least the entire trunnion, from the production line will be readily apparent. Moreover, replacement of the insert can be made without removing the trunnions from their supports 26.

Having illustrated the principles of my invention by what is presently a preferred embodiment, it should be apparent to those persons skilled in the art that such embodiment can be modified in arrangement and detail without departing from such principles. I claim as my invention all such modifications as come within the true spirit and scope of the following claims:

I claim:

1. In a rotary drum filter including a cylindrical filter drum with trunnions at opposite ends mounting said drum for rotation about a central axis, and with one of said trunnions being hollow and rotatably connected to an end portion of a stationary pipe in communication with a source of vacuum to drain filtrate from said drum during its rotation, and fluid sealing means between said pipe and hollow trunnion at a rotatable connection therebetween, characterized in that said hollow trunnion comprises:
an inner cylindrical wall lined with a fiberglass-reinforced plastic material and having a recessed cylindrical surface portion at an outer end portion of said inner wall, said recessed surface portion meeting an adjacent inner wall portion at an annular shoulder to define a recess, said recessed surface portion extending axially to an intersection with an outer end surface of said hollow trunnion so that said recess defines a seat,
a cylindrical sleeve insert of a wear-resistant material for mounting on said seat, said insert having an outer flange collar, and
fastening means for removably connecting said sleeve insert to said hollow trunnion with said insert positioned on said seat and said collar overlapping said outer end surface.

2. In a rotary drum filter according to claim 1, said sleeve insert having an outer diameter corresponding substantially to the inner diameter of said recessed surface portion and an inner diameter corresponding substantially to the inner diameter of said adjacent inner wall portion such that the inner surface of said insert provides a smooth continuation of said adjacent inner wall portion.

3. In a rotary drum filter according to claim 1 wherein said fastening means comprise threaded fasteners which extend through said flange collar and through said outer end surface into threaded engagement with said hollow trunnion.

4. In a rotary drum filter according to claim 1, said sleeve insert being sized such that an inner end of said insert abuts said annular shoulder when said flange collar abuts said outer end surface of said hollow trunnion.

5. In a rotary drum filter according to claim 4, said annular shoulder comprising a stepped shoulder and said sleeve insert having a stepped inner end complementary to said stepped shoulder.

6. In a rotary drum filter according to claim 1, said inner wall of said hollow trunnion including said seat being lined with a lining of fiberglass-reinforced plastic material.

7. In a rotary drum filter according to claim 1, said recessed cylindrical surface portion, said adjacent inner wall portion and said outer end surface being lined with a continuous lining of fiberglass-reinforced plastic material.

8. In a rotary drum filter according to claims 6, or 7, said sleeve insert being mounted to said hollow trunnion in abutment against said lining.

9. A hollow trunnion for a rotary drum filter, said trunnion comprising:

a generally cylindrical body open at both an inner end and an outer end thereof, said body including a cylindrical inner wall extending between said inner and outer ends, said inner wall including a recessed cylindrical inner surface portion adjacent to said outer end and extending to an outer end surface of said trunnion at said outer end, said recessed inner surface portion meeting an adjacent inner wall portion at a shoulder to define a seat, said inner wall including said seat being lined with a plastic material highly resistant to chemical corrosion from pulp processing filtrates, an annular sleeve insert of abrasion-resistant material mounted against said seat, and fastener means removably connecting said seat to said trunnion body.

10. Apparatus according to claim 9 wherein said inner wall and said outer end surface are lined with a continuous lining of fiberglass-reinforced plastic material, said insert including a flanged outer collar covering said outer end surface, and threaded fasteners extending through said collar and trunnion outer end surface to removably connect said insert to said trunnion in overlying relationship to said lining.

* * * * *